(12) United States Patent
Kester et al.

(10) Patent No.: US 9,371,496 B2
(45) Date of Patent: Jun. 21, 2016

(54) CATALYST AND PROCESS FOR HYDROCONVERSION OF A HEAVY FEEDSTOCK

(71) Applicant: SHELL OIL COMPANY, Houston, TX (US)

(72) Inventors: John George Kester, The Woodlands, TX (US); David Andrew Komar, Magnolia, TX (US); David Edward Sherwood, Spring, TX (US)

(73) Assignee: Shell Oil Company, Houston, TX (US)

( * ) Notice: Subject to any disclaimer, the term of this patent is extended or adjusted under 35 U.S.C. 154(b) by 385 days.

(21) Appl. No.: 13/897,756

(22) Filed: May 20, 2013

(65) Prior Publication Data

US 2013/0306517 A1    Nov. 21, 2013

Related U.S. Application Data

(60) Provisional application No. 61/649,451, filed on May 21, 2012.

(51) Int. Cl.
| | | |
|---|---|---|
| C10G 65/12 | (2006.01) |
| B01J 23/883 | (2006.01) |
| B01J 27/19 | (2006.01) |
| B01J 35/10 | (2006.01) |
| C10G 45/08 | (2006.01) |
| C10G 49/04 | (2006.01) |
| B01J 37/04 | (2006.01) |
| B01J 27/199 | (2006.01) |
| B01J 35/02 | (2006.01) |

(Continued)

(52) U.S. Cl.
CPC ............. *C10G 65/12* (2013.01); *B01J 23/883* (2013.01); *B01J 27/19* (2013.01); *B01J 27/199* (2013.01); *B01J 35/023* (2013.01); *B01J 35/026* (2013.01); *B01J 35/1019* (2013.01); *B01J 35/1042* (2013.01); *B01J 35/1061* (2013.01); *B01J 37/0009* (2013.01); *B01J 37/0036* (2013.01); *B01J 37/0201* (2013.01); *B01J 37/04* (2013.01); *C10G 45/08* (2013.01); *C10G 49/04* (2013.01); *C10G 2300/202* (2013.01)

(58) Field of Classification Search
CPC ........ B01J 23/883; B01J 27/19; B01J 27/199; B01J 35/023; B01J 35/026; B01J 35/1019; B01J 35/1042; B01J 35/1061; B01J 37/0009; B01J 37/0036; B01J 37/0201; B01J 37/04; C10G 2300/202; C10G 45/08
See application file for complete search history.

(56) References Cited

U.S. PATENT DOCUMENTS

| | | |
|---|---|---|
| 5,094,994 A | 3/1992 | Sherwood, Jr. et al. |
| 5,416,054 A | 5/1995 | Dai et al. |

(Continued)

OTHER PUBLICATIONS

Van Kerkvoort, W.J. et al.; Determination of Dry-Sludge Content of Fuel Oils: Development of the Shell Hot Filtration Test (SHFT); Jour. Inst. Pet.; vol. 37; pp. 596-604; 1951.

*Primary Examiner* — In Suk Bullock
*Assistant Examiner* — Derek Mueller
(74) *Attorney, Agent, or Firm* — Charles W. Stewart

(57) ABSTRACT

A hydroconversion catalyst comprising a Group VIB metal component, a Group VIII metal component and a carrier material is disclosed wherein said catalyst has a total surface area of 240 to 360 m$^2$/g; a total pore volume of 0.5 to 0.9 cc/g; and a pore volume distribution such that greater than 60% of pore volume are in pores present as micropores of diameter between 55 and 115 Å, less than 0.12 cc/g of pore volume are in pores present at pores of diameter greater than 160 Å and less than 10% of pore volume are in pores present as macropores of diameters greater than 250 Å.

12 Claims, 3 Drawing Sheets

(51) Int. Cl.
*B01J 37/00* (2006.01)
*B01J 37/02* (2006.01)

(56) References Cited

U.S. PATENT DOCUMENTS

| | | |
|---|---|---|
| 5,498,586 A | 3/1996 | Dai et al. |
| 5,545,602 A | 8/1996 | Nelson et al. |
| 5,616,530 A | 4/1997 | Sherwood, Jr. et al. |
| 5,827,421 A | 10/1998 | Sherwood, Jr. |
| 5,928,499 A | 7/1999 | Sherwood, Jr. et al. |
| 6,387,248 B2 | 5/2002 | Sherwood, Jr. et al. |
| 7,790,652 B2 | 9/2010 | Ackerman et al. |
| 7,820,036 B2 * | 10/2010 | Bhan ................ 208/216 PP |
| 2008/0060977 A1 | 3/2008 | Bhan |
| 2010/0006475 A1 | 1/2010 | Ginestra |
| 2010/0243526 A1 | 9/2010 | Ginestra et al. |

* cited by examiner

CATALYST AND PROCESS FOR HYDROCONVERSION OF A HEAVY FEEDSTOCK

This application claims priority to U.S. Provisional Application Ser. No. 61/649,451 filed May 21, 2012, the entire disclosure of which is hereby incorporated by reference.

The invention relates to a composition that is useful as a catalyst for the catalytic hydroconversion of heavy hydrocarbon feedstocks, a method of making such a composition and its use.

There is an ongoing effort to find improved catalyst compositions that may suitably be used in hydroprocessing of heavy hydrocarbon feedstocks. A desirable property of these catalyst compositions includes having high stability in catalytic activity when used in the hydroprocessing of heavy hydrocarbon feedstocks. When these catalysts are used for the hydroconversion of heavy hydrocarbon feedstocks, it is desirable for them to provide for a high conversion of the pitch component, which is a heavy boiling fraction of the heavy hydrocarbon feedstock, to lighter and more valuable components. This conversion of the heavy boiling fraction of a heavy hydrocarbon feedstock requires consumption of hydrogen. It is further desirable to produce low sulfur products for the hydroconverted residual oils including low sulfur vacuum gas oil which is desirable for further cracking in fluid catalyst cracking units and low sulfur unconverted residue for blending into fuel oil, feed for coking units, synthetic crudes and other uses.

There are many patents dealing with hydroprocessing of a heavy hydrocarbon feedstock. Some patents prescribe highly macroporous catalysts (as defined by having a large proportion of catalyst pore volume in pores with diameters greater than or equal to 250 Angstroms (25 nanometers)). These patents include U.S. Pat. No. 5,416,054 (24-29% of Total Pore Volume), U.S. Pat. No. 5,545,602 (22-32% of Total Pore Volume), U.S. Pat. No. 5,827,421 (27-34% of Total Pore Volume), U.S. Pat. No. 5,616,530 (20-30.5% of Total Pore Volume), U.S. Pat. No. 5,928,499 (22-33% of Total Pore Volume), and U.S. Pat. No. 6,387,248 (22-36% of Total Pore Volume). Other patents prescribe very low levels of macroporosity such as U.S. Pat. No. 7,790,652 (<5% of Total Pore Volume in pores with diameters less than or equal to 210 Angstroms). A very limited number of patents recommend intermediate levels of macroporosity as represented by U.S. Pat. No. 5,094,994 (1-15% of Total Pore Volume) and U.S. Pat. No. 5,498,586 (11-18% of Total Pore Volume). An intermediate level of macroporosity might be allowed by U.S. Pat. Appl. Ser. No. 2010/0243526 (>10% of Total Pore Volume).

These patents/patent applications show certain improvements, however better catalysts are still needed. It is desirable for certain hydroprocessing catalysts to provide for the high conversion of the coke precursors of heavy hydrocarbon feedstocks, which are typically referred to as "Micro Carbon Residue," or MCR, in order to prevent or reduce fouling of downstream process equipment and to provide other benefits. It is undesirable in the hydroconversion processes to form sediment in the conversion product, and, thus, a catalyst composition that provides for the high conversion of a heavy feedstock without incremental formation of sediment in the hydroconverted product is a much-desired property of the catalyst and of the process. In addition, it is important to efficiently produce lower sulfur content products at the same time.

It is an object of the invention to provide a hydrotreating and hydroconversion catalyst that is particularly suitable for use in the hydroconversion of a heavy hydrocarbon feedstock.

Another object of the invention is to provide a process for the hydroconversion of a heavy hydrocarbon feedstock.

Yet, another object of the invention is to provide a hydrotreating and hydroconversion catalyst that can suitably be used as the catalyst component of an ebullated bed reactor system.

Still, another object of the invention is to provide a hydrotreating and hydroconversion catalyst that will produce lower sulfur content products in an ebullated bed reactor system.

Accordingly, the present invention is a hydrotreating and hydroprocessing catalyst for treating heavy hydrocarbon feedstocks, wherein said catalyst comprises: a calcined particle comprising a co-mulled mixture made by co-mulling inorganic oxide powders, solution or solutions containing molybdenum and Group VIII metals and optionally water, acid and flocculating agent, and then forming said co-mulled mixture into a particle that is calcined to thereby provide said calcined particle, said calcined particles having:

a. a total surface area by nitrogen method of 240 to 360 $m^2/g$;

b. a total pore volume by mercury porosimetry of 0.5 to 0.9 cc/g;

c. a pore volume distribution such that:
  i. greater than 60% of pore volume are in pores present as micropores of diameter between 55 and 115 Å,
  ii. less than 0.12 cc/g of pore volume is present as micropores of diameter greater than 160 Å, and
  iii. less than 10% of pore volume is present as macropores of diameter greater than 250 Å.

Preferably, said catalyst is extruded in a small diameter and has a shape comprising a first end, a second end and a wall disposed between said ends, said wall comprising 3 or 4 lobes formed in the length of the wall.

Use of the presently claimed catalyst composition in the conversion of a heavy hydrocarbon feeds in an ebullated bed results in an unexpected set of advantages. These include high conversion with no sacrifice in sediment levels, improved hydrodesulfurization activity and a reduced level and amount of sulfur in the product vacuum gas oil (VGO) cut and an improvement in the sulfur content of the unconverted vacuum residue cut. This combination of advantages results from the specific pore distribution of the catalyst and is enhanced by the unusual shape of the catalyst. As for the pore distribution, it is important that greater than 60% of pore volume are in pores present as micropores of diameter between 55 and 115 Å, less than 0.12 cc/g of pore volume is present as micropores of diameter greater than 160 Å, and less than 10% of pore volume is present as macropores of diameter greater than 250 Å.

The catalyst particles are preferably extrudates. The presently claimed catalyst most preferably has a shape different from the normal cylindrical shape, and it comprises a first end, a second end and a wall disposed between said ends, said wall comprising 3 or 4 lobes formed in the length of the wall. In a preferred embodiment, each catalyst particle has an outer circle diameter of $D_O$, an inner circle diameter of $D_I$, and a height of H, as shown in FIGS. 3A and 3B. The ratio of $D_O$ to $D_I$ is between about 1.5 to 3.0, preferably about 2.0 to 3.0. The ratio of H to $D_O$ is between about 1 to about 4, preferably about 1 to about 3.

The shapes of the lobes include truncated lobes with rounded intersections of the lobes and semi-circular lobes with rounded intersections of the lobes. $D_O$ is between 0.75 and 2.0 millimeters.

The inner circle diameter is the diameter resulting from connecting the innermost points of the crenellations. As a result of this novel shape for an ebullated bed catalyst, it is possible to take advantage of the crenellations to provide improved access of the hydrogen-saturated reactants to the pellet interiors and improved egress of the products from the pellet interiors. In the past it was desired to reduce the diameter of cylindrical catalyst to provide greater access and egress of hydrogen-saturated reactants and products, but there are limits to making much smaller diameter pellets since the catalyst at some point would be subject to increased breakage if the diameter became too small. By use of the lobes of the presently claimed catalyst it is possible to retain the structural integrity of the catalyst and still increase the access of hydrogen-saturated reactants and the egress of products.

The catalyst composition of the invention in one embodiment is made by a method comprising mixing alumina powder or powders, a Group VIB metal component, typically, as a solution of its salt(s), and a Group VIII metal component, typically, in the same solution of the Group VIB metal component or as a second solution of its salt(s), and optionally water, acid and flocculating agent, to provide a co-mulled mixture; forming an agglomerate of said co-mulled mixture; and calcinating said agglomerate in air without added steam under calcination conditions that include a calcination temperature exceeding 1150° F. to thereby provide said catalyst composition.

The catalyst composition of the invention can be used in a process for the hydroconversion of a heavy hydrocarbon feedstock, wherein said process comprises: contacting, under suitable hydroconversion conditions, said heavy hydrocarbon feedstock with the catalyst composition.

The inventive catalyst composition is particularly useful in the hydroconversion of heavy hydrocarbon feedstocks. It has a high activity toward the conversion of the vacuum residue portion, sometimes referred to as the pitch portion, said portion having a substantial amount of material with a boiling point greater than 1,000° Fahrenheit, and the micro carbon residue (MCR) content of a heavy hydrocarbon feedstock while minimizing undesirable formation of sediment when the catalyst is used in the catalytic hydroconversion of the heavy hydrocarbon feedstock. It is most particularly useful in providing an improved level of hydrodesulfurization and improved sulfur levels in the products.

An important and essential feature of the inventive catalyst composition is that it has a relatively high surface area as measured by nitrogen methods and a specifically defined pore size distribution as measured by mercury porosimetry, that, in combination with the particular metal loadings of the catalyst composition and the unusual shape, can contribute to its catalytic properties of providing for high pitch and MCR conversion with a minimal amount of sediment formation and an improved level of hydrodesulfurization and improved sulfur level in the products.

Figure 1:
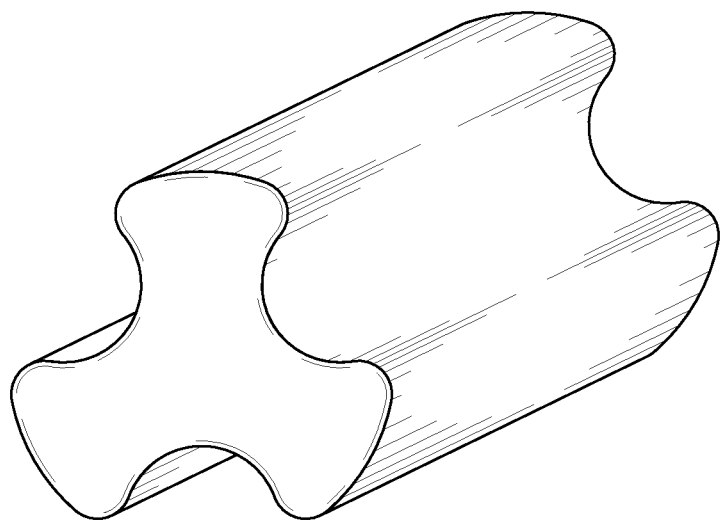
FIG. 1 depicts a first embodiment of the shape of the catalyst with three truncated lobes.
Figure 2:
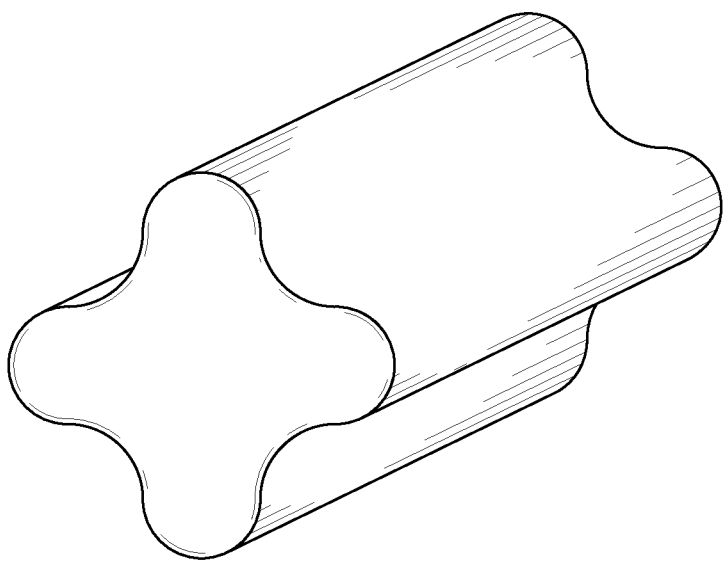
FIG. 2 depicts a second embodiment of the shape of the catalyst with four semi-circular lobes.
Figure 3A:
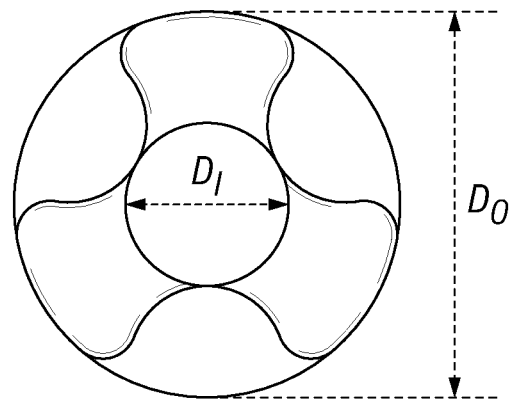
FIG. 3A shows the overall dimensions of the face of the catalyst particle and FIG. 3B shows the overall height of the catalyst particle.
Figure 3B:
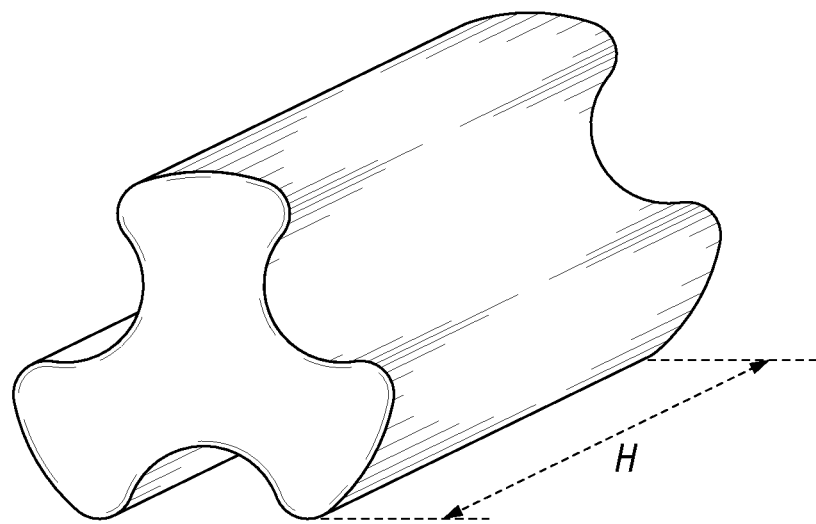
Figure 4:
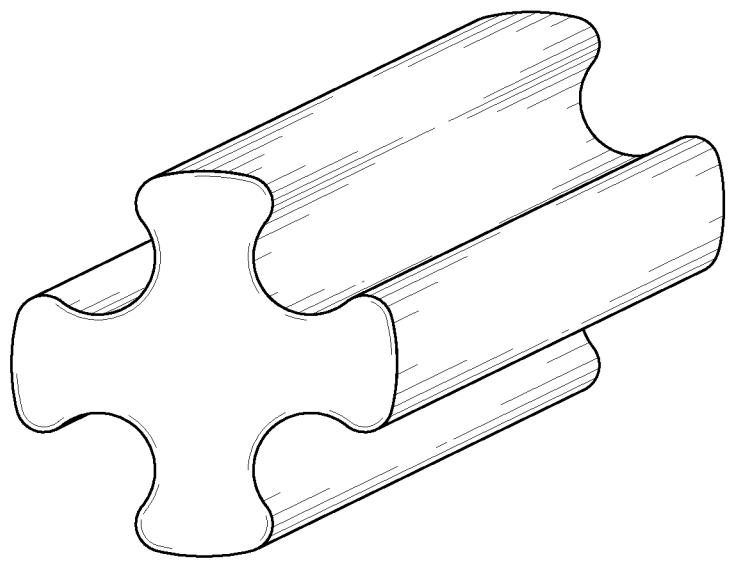
FIG. 4 depicts a third embodiment of the catalyst with four truncated lobes.
Figure 5:
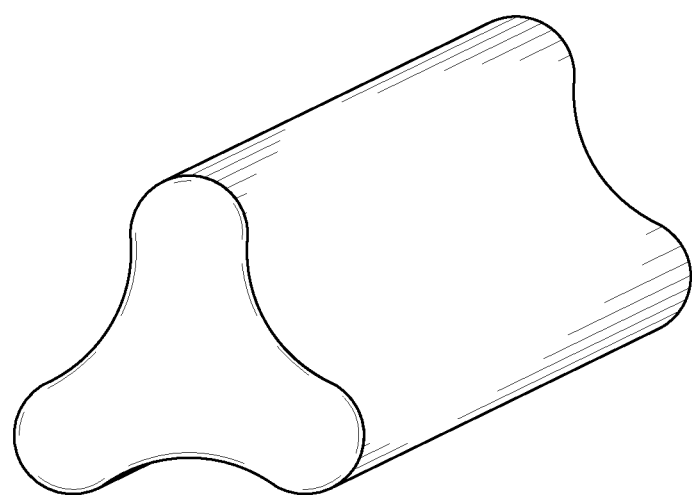
FIG. 5 depicts a fourth embodiment of the catalyst with three semi-circular lobes.

The Group VI-B component is present in the calcined agglomerate of the catalyst composition in an amount that is greater than or equal to 1 wt. % and in an amount that is less than 24 wt. % when calculated as the Group VI-B metal oxide. The Group VI-B metal may be chromium, molybdenum or tungsten, preferably molybdenum. It is preferred, however, for the molybdenum component to be present in the calcined agglomerate in an amount in the range of from 7.5 wt. % to 11 wt. %, when calculated as molybdenum oxide, $MoO_3$. These weight percentages (wt. %) are based on the total weight of the calcined agglomerate (i.e., the total weight includes the sum of all the individual components of the catalyst composition including the support material, metals, and any other components) and assuming that the Group VI-B component is present in the oxide form, e.g., $MoO_3$, regardless of its actual form.

The Group VIII component is preferably selected from the group consisting of nickel, cobalt and iron, most preferably it is nickel. The amount of Ni is present in the calcined agglomerate of the catalyst composition in an amount that is greater than or equal to 0.2 wt. % and in an amount that is less than or equal to 6 wt. %, when calculated as nickel oxide, NiO. It is preferred, however, for the Group VIII component, preferably nickel, to be present in the calcined agglomerate in an amount in the range of from 1.5 wt. % to 3.5 wt. These weight percentages (wt. %) are based on the total weight of the calcined agglomerate (i.e., the total weight includes the sum of all the individual components of the catalyst composition including the support material, metals, and any other components) and assuming that the Group VIII component is present in the oxide form, e.g., NiO, regardless of its actual form.

The catalyst composition may also include a phosphorous component. The amount of the phosphorous component in the catalyst composition can be in the range of from or about 0.0 wt. % to or about 6 wt. % (2.63 wt. % elemental phosphorous). Typically, the phosphorous component is present in the catalyst composition in the range of from 0.0 wt % to 2 wt. %. These weight percentages (wt. %) are based on the total weight of the catalyst composition and assuming that the phosphorous component is present in the oxide form, i.e., $P_2O_5$, regardless of the form that it is actually in.

Considering the effect that cobalt and certain other of the Group VIII metals may have on the performance of the inventive catalyst composition, the catalyst composition, as an alternative to one that comprises a molybdenum component, a nickel component, and alumina, may consist essentially of alumina, a molybdenum component, a nickel component, and, optionally, a phosphorous component, all in the proportions and concentrations as described herein.

The catalyst composition of the invention has a relatively high total surface area, as determined by the nitrogen BET method, which is in the range of from 240 $m^2/g$ to 360 $m^2/g$. A preferable range for the total surface area of the catalyst is from 245 $m^2/g$ to 285 $m^2/g$.

As earlier mentioned, the catalyst composition has a specifically defined pore structure that, in combination with the particular metal loadings and overall shape of the catalyst composition, provides for the minimization of the formation of sediment when used in the hydroconversion of a heavy hydrocarbon feedstock. This pore structure is such that from greater than 60% of the total pore volume of the catalyst is present as pores having a diameter in the range of from 55 Å to 115 Å, less than 0.12 cc/g of the total pore volume of the catalyst is present as micropores of diameter greater than 160 Å, and less than 10% of pore volume is present as macropores of diameter greater than 250 Å.

The references herein to the pore size distribution and pore volume of the catalyst composition are to those properties as determined by mercury penetration porosimetry. The measurement of the pore size distribution of the catalyst composition is by any suitable mercury porosimeter capable of working in the pressure range between atmospheric pressure and about 60,000 psi, using a contact angle of 130° with a mercury surface tension of 484 dyne/cm at 25° C.

Pore volume is defined as the total volume using the mercury intrusion method as measured between atmospheric pressure and a pressure of about 60,000 psia.

The shape of the catalyst is also important in the performance of the catalyst. The catalyst preferably has a shape comprising a first end, a second end and a wall disposed between said ends, said wall comprising 3 or 4 lobes formed in the length of the wall with dimensions as stated above.

As noted above, it is believed that the combination of the multi-lobal shape with the specific pore structure and high surface area of the catalyst composition provides for the unique catalytic performance properties of the inventive catalyst. It is quite unexpected to find a catalyst composition that allows high conversion with no sacrifice in sediment levels, improved hydrodesulfurization activity and a reduced level and amount of sulfur in the product VGO cut and an improvement in the sulfur content of the unconverted vacuum residue cut, all at the same time. The combination of the features of the catalyst of the Instant Invention provides for a catalyst composition that is very active toward the high conversion of pitch and MCR of a heavy hydrocarbon feedstock but which causes a correspondingly low amount of sediment formation and an increased level of hydrodesulfurization.

In the co-mulled embodiment of the inventive catalyst composition, the co-mulled mixture of the starting materials or components of the catalyst composition includes the components of alumina powder, a nickel compound and a molybdenum compound. The starting components may also include a phosphorus compound or catalyst fines, or both, in addition to the aforementioned alumina, nickel and molybdenum as well as water or acid, or both. The nickel compound may be introduced into the co-mulled mixture as an aqueous solution of a nickel salt. The molybdenum compound may also be introduced into the co-mulled mixture as an aqueous solution of a molybdenum salt. A single solution containing both the nickel compound and molybdenum compound may also be employed. A flocculating agent may be added.

The co-mulled mixture is formed into particles, such as extrudates, that are then calcined in air at a calcination temperature within a certain range to thereby provide the final catalyst composition. It is believed that this co-mulling may provide for a final catalyst having catalytic or physical, or both, properties that are distinguishable over those of other hydroprocessing catalysts that have been prepared by a different method, such as, for example, by support formation followed by impregnation.

The term "co-mulling" is used broadly in this specification to mean that at least the recited starting materials are mixed together to form a mixture of the individual components that is preferably substantially uniform or homogeneous. This term is intended to be broad enough in scope to include the mixing of the starting materials so as to yield a paste that exhibits properties making it capable of being extruded or formed into extrudate particles by any of the known extrusion methods.

The preferred method of agglomerating the mixture is by extrusion to form extrudate particles, typically for use in ebullated bed reactors, having overall diameters in the range of from 0.9071 mm (1/28 inch) or 1.016 mm (1/25 inch) to 1.1043 mm (1/23 inch) and length to diameter ratios of from 2.0:1 to 3.5:1 or even higher.

Thus, the formation of the co-mulled mixture may be done by any method or means known to those skilled in the art, including, but not limited to, the use of such suitable types of solids-mixing machines as tumblers, stationary shells or troughs, muller mixers, which are either batch type or continuous type, and impact mixers, and the use of such suitable types of either batch-wise or continuous mixers for mixing solids and liquids or for the formation of paste-like mixtures that are extrudable.

Suitable types of batch mixers include, but are not limited to, change-can mixers, stationary-tank mixers, double-arm kneading mixers that are equipped with any suitable type of mixing blade.

Suitable types of continuous mixers include, but are not limited to, single or double screw extruders, trough-and-screw mixers and pug mills.

The mixing of starting materials used in the preparation of the co-mulled mixture may be conducted during any suitable time period necessary to properly homogenize the co-mulled mixture. Generally, the blending time may be in the range of upwardly to 12 or more hours. Typically, the blending time is in the range of from 0.1 hours to 1 hour.

The alumina powder component used in the formation of the co-mulled mixture comprises particles of alumina. The alumina is preferably predominantly in the pseudo-boehmite crystalline form ($Al_2O_3 \cdot xH_2O$ where x is an intermediate value between x=1 boehmite and x=3 gibbsite), with about 20 wt. % to 30 wt. % water content, and is characterized as having a median pore diameter by surface area from mercury porosimetry (with a contact angle of 140 degrees) in the range of from about 60 Å to about 120 Å. The alumina is in a reasonably divided state so as to be in the form of a powder (when dry) that allows for its co-mulling or mixing with the metal compounds, water and other constituents that make up the co-mulled mixture of the invention.

The alumina powder component may contain silica and, if silica is present, it is preferred for the alumina to contain less than 2 wt. % silica, and, most preferred, less than 1 wt. % silica. The alumina is in a reasonably divided state so as to be in the form of a powder (when dry) that allows for its co-mulling or mixing with the metal compounds, water and other constituents that make up the co-mulled mixture of the invention.

The alumina particles of the alumina powder may be described in terms of mesh size with most of the particles, i.e. at least 90 wt. % of the particles, being able to pass through the mesh of a sieve No. 35 (nominal sieve opening of 0.500 mm) and most of the particles, i.e., at least 90 wt. % of the particles, not being able to pass through or being retained by the mesh of a sieve No. 400 (nominal sieve opening of 0.037 mm).

The nickel compound used in the preparation of the co-mulled mixture is any suitable nickel compound that is convertible to a nickel oxide form by calcination in air under the calcination conditions as defined herein. Possible suitable nickel compounds include nickel oxides, nickel carbonates, nickel hydroxides, and nickel nitrates. One particularly suitable nickel compound is nickel nitrate.

The molybdenum compounds used in the preparation of the co-mulled mixture can be molybdenum oxide and any other suitable molybdenum compound that is convertible to a molybdenum oxide form by calcination in air under the calcination conditions as defined herein. Possible suitable molybdenum compounds include molybdenum oxides, molybdenum oxide hydrates and molybdates. One particularly suitable molybdenum compound is ammonium heptamolybdate.

To help control the macroporosity (as defined elsewhere herein) of the catalyst composition, in one embodiment of the invention, the fines of an already prepared hydroprocessing catalyst, that is typically a fresh or unused hydroprocessing catalyst, that contains nickel, molybdenum and phosphorous components supported on an alumina support is mixed or co-mulled along with the alumina powder, the nickel compound, the molybdenum compound, and, optionally, the phosphorus compound, acid, water and optionally a flocculating agent that form the co-mulled mixture. Fines from other types of catalysts or alumina supports may also be employed, including used hydroprocessing catalyst that has been regenerated in full or in part or not at all.

The fresh hydroprocessing catalyst from which the catalyst fines are prepared may be selected from commercially available hydroprocessing catalyst products, which include typical impregnated catalysts, or it may be obtained from the processing of the co-mulled catalyst composition of the instant invention. The hydroprocessing catalyst from which the catalyst fines are derived generally has a Group VI-B hydrogenation metal content in the range of from 1 to 35 wt. %, calculated as trioxide (e.g., $MoO_3$), a Group VIII hydrogenation metal content in the range of from 1 to 10 wt. %, calculated as oxide (e.g., NiO), and, optionally, a phosphorus content in the range upwardly to 10 wt. %, calculated a $P_2O_5$. The hydroprocessing catalyst fines generally have a mean pore diameter in the range of from 40 Å to 150 Å.

To prepare the catalyst fines used in the blending with the other components of the co-mulled mixture, the material (e.g., hydroprocessing catalyst) is ground into a powder containing catalyst particles wherein at least 90 wt. % are able to pass through the mesh of a sieve No. 40 (nominal sieve opening of 0.420 mm) Any suitable equipment known to those skilled in the art that is capable of grinding the material into particles to form a powder may be used to prepare the catalyst fines with average particle size between 5 and 50 microns (where one micron=$10^{-6}$ meters). An example of one such piece of equipment is a conventional hammer mill.

The amount of catalyst fines mixed with the other components of the co-mulled mixture is such as to help control the macroporosity of the final catalyst composition of the invention to within the desired ranges as described herein. Thus, the amount of catalyst fines contained in the co-mulled mixture can be in the range upwardly to 35 weight percent (i.e., from 0 wt. % to 35 wt. %) of the total weight, on a dry basis, of the alumina powder or powders and catalyst fines that make up the catalyst. In certain embodiments, the catalyst fines contained in the co-mulled mixture is in the range of from 1 to 30 wt %, preferably, from 5 to 25 wt %.

The particles formed by agglomerating the co-mulled mixture are calcined in air under suitable calcination conditions so as to provide the final catalyst composition of the invention. The calcination conditions should be such as to convert the nickel and molybdenum compounds of the co-mulled mixture and agglomerate to oxide forms and to provide a final catalyst composition having the desired physical properties as described herein.

The calcination of the agglomerate formed from the co-mulled mixture, preferably, should not be a hydrothermal-type calcination, which is an exposure of the agglomerate to an atmosphere of air with a significant presence of steam at a reasonably high temperature. Rather, the calcination of the agglomerate should be in the presence of an air atmosphere having no material or significant addition of steam. Thus, the calcination of the agglomerate may be conducted in an atmosphere of air that has a concentration level of water that is typically observed in air at standard conditions, but there should be no material addition of water to the heated air beyond that which is naturally contained in air.

A material addition of water is defined as an amount of water that is added to the heated air used in the calcination of the agglomerate that would materially affect the final properties of the calcined agglomerate or final catalyst composition of the invention.

An example of air that may suitably be used in the calcination of the agglomerate of the co-mulled mixture is air that is saturated with water at a temperature of 60.degree. F. and 1 atmosphere of pressure.

The calcination temperature should exceed 621° C. (1150° F.). The preferred range for the calcination temperature is from 635° C. (1175° F.) to 927° C. (1700° F.), and, a more preferred range for the calcination temperature is from 649° C. (1200° F.) to 815° C. (1500° F.). The most preferred calcination temperature is in the range of from 663° C. (1225° F.) to 815° C. (1500° F.).

The heavy hydrocarbon feedstock of the invention can be obtained from any suitable source of hydrocarbons, including, for example, petroleum crude oils and tar sand hydrocarbons, such as, heavy oils extracted from tar sand. The heavy hydrocarbon feedstock can be a vacuum reside or atmospheric reside component of a petroleum crude oil or tar sand hydrocarbon. The heavy hydrocarbon feedstock can further include high concentrations of sulfur and nitrogen compounds and metals, such as, nickel and vanadium. Indeed, it is the high concentrations of metal, sulfur and nitrogen compounds in addition to the high molecular weight of the heavy hydrocarbon feedstock that make its hydroprocessing so challenging.

The heavy hydrocarbon feedstock, thus, includes a mixture of hydrocarbons derived from a crude oil or tar sand hydrocarbon material or other source of heavy hydrocarbons. A major portion of the heavy hydrocarbons of the mixture has a boiling temperature exceeding about 343° C. (650° F.). In addition, a portion, preferably a major portion, of the heavy hydrocarbons of the mixture has a boiling temperature exceeding about 538° C. (1000° F.). The preferred heavy hydrocarbon feedstock has a boiling range such that at least 50 weight percent boils at a temperature exceeding 538° C. (1000° F.), and, most preferably, at least 80 weight percent of the heavy hydrocarbon feedstock boils at a temperature exceeding 538° C. (1000° F.).

The boiling ranges referenced herein are as determined by ASTM test procedure D-1160. The API gravity of the heavy hydrocarbon feedstock can range from about 0 to about 20, but, more specifically, the API gravity is in the range of from 3 to 15, and, more specifically, from 4 to 11.

The heavy hydrocarbon feedstock can also have a micro carbon residue (MCR) content, as determined by ASTM testing method D-4530, exceeding 10 weight percent, and, more specifically, the MCR content exceeds 12 weight percent, and, most specifically, it exceeds 14 weight percent. A potential upper limit for the MCR content is less than 40 weight percent.

The heavy hydrocarbon feedstock can also comprise sulfur compounds in amounts such that the concentration of sulfur in the heavy hydrocarbon feedstock exceeds about 2 weight percent and even exceeds 3 weight percent. More specifically, the sulfur concentration in the heavy hydrocarbon feedstock can be in the range of from 2 to 10 weight percent, or from 4 to 7 weight percent.

The heavy hydrocarbon feedstock can further comprise nitrogen compounds in amounts such that the concentration of nitrogen in the heavy hydrocarbon feedstock exceeds 0.1 weight percent and even exceeds 0.2 weight percent. More specifically, the nitrogen concentration in the heavy hydrocarbon feedstock can be in the range of from 0.2 to 3 weight percent.

As earlier noted, the metals contained in the heavy hydrocarbon feedstock can include nickel or vanadium, or both. The nickel concentration in the heavy hydrocarbon feedstock can exceed 10 parts per million by weight (ppmw) or it can exceed 30 ppmw. More specifically, the nickel concentration in the heavy hydrocarbon feedstock can be in the range of from 10 parts per million by weight (ppmw) to 500 ppmw, or from 40 to 500 ppmw.

The vanadium concentration in the heavy hydrocarbon feedstock can exceed 50 ppmw or it can exceed 100 ppmw. More specifically, the vanadium concentration in the heavy hydrocarbon feedstock can be in the range of from 50 ppmw to 1500 ppmw.

The process of the invention includes contacting the heavy hydrocarbon feedstock, preferably in the presence of hydrogen, with the catalyst composition of the invention under suitable hydroprocessing conditions. The inventive process provides for an exceptionally high percentage conversion of the pitch, MCR and sulfur contents of the heavy hydrocarbon feedstock.

While it is recognized that the term "pitch" may have different definitions by and among hydroprocessing operators depending upon their experience and local custom, as the term is used in this specification, except as otherwise specified, and in the claims, it refers to the hydrocarbon molecules contained in the fraction of the heavy hydrocarbon feedstock that boil at temperatures above 538° C. (1000° F.).

The references herein to "pitch conversion" or similar references to the conversion of pitch, except as otherwise specified, are speaking of the cracking of the heavy hydrocarbon molecules that make up the pitch component of the heavy hydrocarbon feedstock to smaller hydrocarbon molecules that boil at temperatures below 538° C. (1000° F.).

The percent conversion of pitch is then defined as being the weight of the pitch contained in the heavy hydrocarbon feedstock that is converted by the hydroconversion process, and it can be represented by the ratio of the difference between the weight of pitch in a feed and the weight of pitch in the product with the resulting difference being divided by the weight of pitch in the feed and the resulting ratio being multiplied by 100 to provide the percentage pitch conversion.

The percent conversion of MCR is defined as being the weight of MCR contained in the heavy hydrocarbon feedstock that is converted by the hydroconversion process, and it can be represented by the ratio of the difference between the weight of MCR in a feed and the weight of MCR in the product with the resulting difference being divided by the weight of MCR in the feed and the resulting ratio being multiplied by 100 to provide the percentage MCR conversion.

The percent sulfur conversion is defined in a similar manner as are the pitch conversion and MCR conversion in that it is the weight of sulfur that is contained in the heavy hydrocarbon feedstock that is converted by the hydroconversion process. Sulfur conversion can be represented by the ratio of the difference between the weight of sulfur in a feed and the weight of sulfur in the product with the resulting difference being divided by the weight of sulfur in the feed and resulting ratio being multiplied by 100 to provide the percentage sulfur conversion. The sulfur content of various product streams are represented by weight percentages of sulfur in those product steams, said streams being obtained by fractionation of the reactor effluent, and are calculated as the ratio of the weight of sulfur of the individual product stream divided by the weight of the individual product stream itself multiplied by 100.

The hydroconversion process can be carried out by the use of any suitable reaction means or system including fixed bed, moving bed, fluidized bed and ebullated bed reactor systems. While the inventive catalyst composition can be used as a part of any suitable reactor system, its properties make it particularly suitable for use in ebullated bed systems.

The hydroprocessing conditions under which the heavy hydrocarbon feedstock is contacted with the hydroconversion catalyst composition of the invention include those process conditions that are effective in providing for a hydrotreated and hydroconverted product and, preferably, that are effective in the conversion of a significant portion of the pitch and MCR components of the heavy hydrocarbon feedstock but with a minimum formation of sediment.

The conversion of the pitch component can exceed about 50 weight percent of the pitch. A higher pitch conversion is desirable and, thus, preferably, pitch conversion exceeds 55 weight percent, and, most preferably, pitch conversion exceeds 60 weight percent.

Sediment is considered herein to be that as measured by testing a sample by the Shell Hot Filtration Test (SHFT). See Jour. Inst. Pet. (1951), Volume 37, pages 596-604, "Determination of Dry-Sludge Content of Fuel Oils: Development of the Shell Hot Filtration Test (SHFT), by van Kerkvoort et al., which is incorporated herein by reference. The sediment content of the hydroconversion product resulting from the hydroprocessing of the heavy hydrocarbon feedstock using the inventive catalyst composition is typically low and most typically less than or equal to 0.1 weight percent in the fraction of the feed which boils above 650-680° F. (343-360° C.).

Suitable hydroprocessing conditions under which the heavy hydrocarbon feedstock is contacted with the hydroconversion catalyst composition of the invention can include a hydroconversion contacting temperature in the range of from about 300° C. (572° F.) to about 700° C. (1292° F.), a hydroconversion total contacting pressure in the range of from about 500 psia to about 6,000 psia, which includes a hydrogen partial pressure in the range of from about 500 psia to about 3,000 psia, a hydrogen addition rate per volume of heavy hydrocarbon feedstock in the range of from about 500 SCFB to about 10,000 SCFB, and a hydroconversion liquid hourly space velocity (LHSV) in the range of from about 0.2 $hr^{-1}$ to 5 $hr^{-1}$.

The preferred hydroconversion contacting temperature is in the range of from 310° C. (590° F.) to 650° C. (1202° F.), and, most preferred, from 316° C. (600° F.) to 600° C. (1112° F.).

The preferred hydroconversion total contacting pressure is in the range of from 500 psia to 3,000 psia, most preferably, from 1,000 psia to 2,850 psia.

The LHSV is preferably in the range of from 0.2 $hr^{-1}$ to 4 $hr^{-1}$, and, most preferably, from 0.2 $hr^{-1}$ to 3 $hr^{-1}$. The hydrogen addition rate is preferably in the range of from 600 SCFB to 8,000 SCFB, and, more preferably, from 700 SCFB to 6,000 SCFB.

The unique properties of the inventive catalyst composition allow for a significant improvement in the operation of existing hydroconversion process systems by the replacement of the catalyst that has been used in such systems with the inventive catalyst composition that exhibits the above-described enhanced hydroconversion properties.

The following Examples are presented to illustrate the invention, but they should not be construed as limiting the scope of the invention.

EXAMPLE 1

As described above, some prior art patents prescribe highly macroporous catalysts (as defined by having a large proportion of catalyst pore volume in pores with diameters greater than or equal to 250 Angstroms (25 nanometers)). These patents include U.S. Pat. No. 5,416,054 (25-29% of Total Pore Volume), U.S. Pat. No. 5,545,602 (22-32% of Total Pore Volume), U.S. Pat. No. 5,827,421 (27-34% of Total Pore Volume), U.S. Pat. No. 5,616,530 (20-30.5% of Total Pore Volume), U.S. Pat. No. 5,928,499 (22-33% of Total Pore Volume), and U.S. Pat. No. 6,387,248 (22-36% of Total Pore Volume). An intermediate level of macroporosity might be allowed by U.S. Pat. Appl. Ser. No. 2010/0243526 but it still requires >10% of Total Pore Volume being greater than 250 Angstroms. The Instant Invention is distinguished from these patents and patent application in that the catalysts of the Instant Invention require <10% of Total Pore Volume in pores with diameters greater than or equal to 250 Angstroms (25 nanometers).

On the other hand, other patents prescribe very low levels of macroporosity (as defined by having a very low proportion of catalyst pore volume in pores with diameters greater than or equal to about 250 Angstroms (25 nanometers)), such as U.S. Pat. No. 7,790,652. The catalysts of U.S. Pat. No. 7,790,652 require less than 5% of Total Pore Volume in pores with diameters greater than about 210 Angstroms. The Instant Invention is distinguished from this patent in that the catalysts of the Instant Invention requires >5% of Total Pore Volume in pores with diameters greater than 210 Angstroms (21 nanometers).

A very limited number of patents recommend intermediate levels of macroporosity (as defined by having a very low proportion of catalyst pore volume in pores with diameters greater than or equal to about 250 Angstroms (25 nanometers)) as represented by U.S. Pat. No. 5,094,994 (1.0-15% of Total Pore Volume) and U.S. Pat. No. 5,498,586 (11-18% of Total Pore Volume).

U.S. Pat. No. 5,094,994 (to Texaco as assignee of Sherwood, Jr., et al.), discloses a catalyst composition useful in the hydroprocessing of a sulfur and metal-containing feedstock comprising an oxide of nickel or cobalt and an oxide of molybdenum on a porous alumina support in such a manner that the molybdenum gradient of the catalyst has a value of less than 6.0 and 15-30% of the nickel or cobalt is in an acid extractable form, having a surface area of 150-210 m$^2$/g, a Total Pore Volume (TPV) of 0.50-0.75 cc/g, and a pore size distribution such that less than 25% TPV is in pores having diameters less than 100 Angstroms, 70.0-85.0% TPV is in pores having diameters of 100-160 Angstroms and 1.0-15.0% TPV is in pores having diameters greater than 250 Angstroms. The instant invention is distinguished from Sherwood, Jr. et al. (U.S. Pat. No. 5,094,994) in that Sherwood, Jr. et al. requires less than 25% TPV is in pores having diameters less than 100 Angstroms, whereas, the catalysts of the instant invention require much higher pore volume in pores having diameters less than 100 Angstroms.

U.S. Pat. No. 5,498,856 (to Texaco as assignee of Dai et al.) discloses a catalyst composition useful in the hydroconversion of a sulfur- and metal-containing feedstock comprising an oxide of a Group VIII metal and an oxide of a Group V-IB metal and optionally phosphorus on a porous alumina support, the catalyst having a Total Surface Area of 240-310 m$^2$/g, a Total Pore Volume of 0.5-0.75 cc/g, and a Pore Diameter Distribution whereby 63-78% of the Total Pore Volume is present as micropores of diameter 55-115 Angstroms and 11-18% of the Total Pore Volume is present as macropores of diameter greater than 250 Angstroms. The instant invention is distinguished from Dai et al. (U.S. Pat. No. 5,498,856) in that Dai et al. requires 63-78% of the Total Pore Volume is present as micropores of diameter 55-115 Angstroms, whereas, the catalysts of the instant invention require higher pore volumes in this region. In addition, Dai et al. requires 11-18% of the Total Pore Volume is present as macropores of diameter greater than 250 Angstroms., whereas, the catalysts of the instant invention require less pore volume in this region.

A detailed comparison of the requirements of U.S. Pat. No. 5,094,994, U.S. Pat. No. 5,498,856 and the instant invention are given in Table 1.

TABLE 1

|  |  | 5,094,994 Claim 1 | 5,094,994 Claim 6 | 5,498,586 Claim 1 | Instant Invention (broad) | Instant Invention (preferred) |
|---|---|---|---|---|---|---|
| Ni oxide or Co oxide | Wt % | 1.0-5.0 | 2.5-3.5 |  |  |  |
| Group VIII metal oxide | Wt % |  |  | 3-6 | 0.2-6 | 1.5-3.5 |
| Mo oxide | Wt % | 10.0-25.0 | 12.0-18.0 |  |  |  |
| Group VI-B metal oxide | Wt % |  |  | 14.5-24 | 1-24 | 7.5-11 |
| Phosphorus oxide | Wt % |  |  | 0-6 | 0-6 | 0-2 |
| Molybdenum |  |  |  |  |  |  |
| Gradient |  | <6.0 | 1.5-5.0 |  |  |  |
| Extractable Ni or Co | % | 15-30 | 15-30 |  |  |  |
| N2 Technique Parameters |  |  |  |  |  |  |
| Surface Area | m$^2$/g | 150-210 | 170-205 | 240-310 | 240-360 | 245-285 |
| Hg Porosimetry Parameters |  |  |  |  |  |  |
| Total Pore Volume (TPV) | cc/g | 0.5-0.75 | 0.60-0.70 | 0.5-0.75 | 0.5-0.9 | 0.65-0.75 |
| PV 55-115A | % TPV |  |  | 63-78 | >60 | >75 |
| PV <100A | % TPV | <25.0 | 5.0-20.0 |  |  |  |
| PV 100-160A | % TPV | 70.0-85.0 | 70.0-80.0 |  |  |  |
| PV >250A | % TPV | 1.0-15.0 | 4.0-14.0 | 11-18 | <11 | 0-9 |
| PV >160A | cc/g |  |  | 0.12-0.16 | <0.12 | <0.10 |

EXAMPLE 2

In Example 2, four comparative examples are shown. Comparative examples A, C, and D exemplify the type of catalyst and pore structure found in the prior art—i.e. in US Pat. Appl. No. 2010/0243526. Comparative catalysts A, C, and D were extruded as normal cylindrical pellets, not containing any lobes.

Comparative Catalyst C

A co-mulled mixture was prepared by mixing in a muller mixer 2721.6 parts (2049.4 on a dry basis) wide pore alumina powder and 579.9 parts (549.9 on a dry basis) green catalyst fines with a molybdenum component mixture of 342.8 parts ammonium heptamolybdate (27% $MoO_3$) and 1428.8 parts water and a nickel component mixture of 325.3 parts nickel nitrate solution, 79.1 parts 70% nitric acid and 1428.8 parts water. The components where mulled for 30 minutes followed by the addition of 13.7 parts flocculant (Superfloc LMW 300) followed by another 5 minutes of mixing. The co-mulled mixture was then extruded into cylinders that were dried in air at an approximate temperature of 250 F. for about 1 hour. Thereafter, the dried extrudates were calcined in air for 1 hour at a temperature of 1400 F.

Comparative Catalyst D

A co-mulled mixture was prepared by mixing in a muller mixer 2721.6 parts (2049.4 on a dry basis) wide pore alumina powder and 594.3 parts (563.5 on a dry basis) green catalyst fines with a molybdenum component mixture of 539.1 parts ammonium heptamolybdate (27% $MoO_3$) and 1406.2 parts water and a nickel component mixture of 333.3 parts nickel nitrate solution, 81.1 parts 70% nitric acid and 1406.2 parts water. The components where mulled for 30 minutes followed by the addition of 14.1 parts flocculant (Superfloc LMW 300) followed by another 5 minutes of mixing. The co-mulled mixture was then extruded into cylinders that were dried in air at an approximate temperature of 250° F. for about 1 hour. Thereafter, the dried extrudates were calcined in air for 1 hour at a temperature of 1370° F.

Comparative Catalyst A

This Comparison Catalyst was made in an analogous way to Catalysts C and D in commercial equipment. It was made so as to have the same Total Surface Area and pore size distribution as the catalysts of US Pat. Appl. No. 2010/0243526 and the same low Mo content (calculated as $MoO_3$) as the catalysts of US Pat. Appl. No. 2010/0243526, but with a relatively low nickel oxide to molybdenum oxide ratio (calculated as $NiO/MoO_3$) compared to the catalysts of the US Pat. Appl. No. 2010/0243526. Comparative Catalyst A was composed of particles with cylindrical shapes.

Comparative Catalyst B

This Comparison Catalyst B was made in an analogous way to Catalysts C and D but the catalyst was extruded in a trilobe shape. It was made so as to have the same Total Surface Area and pore size distribution as the catalysts of US Pat. Appl. No. 2010/0243526 and the same low Mo content (calculated as $MoO_3$) as the catalysts of US Pat. Appl. No. 2010/0243526, but with a relatively low nickel oxide to molybdenum oxide ratio (calculated as $NiO/MoO_3$) compared to the catalysts of the US Pat. Appl. No. 2010/0243526 and similar to the level of Comparative Catalyst A.

A co-mulled mixture was prepared by mixing in a muller mixer 2925.7 parts (2200.1 on a dry basis) alumina powder and 628.2 parts (599.6 on a dry basis) green catalyst fines with a molybdenum component mixture of 650.8 parts ammonium heptamolybdate solution (27% $MoO_3$) and 1564.9 parts water and a nickel component mixture of 134.5 parts nickel nitrate solution (14% Ni), 107.4 parts 70% nitric acid and 1564.9 parts water. The components were mulled for 35 minutes followed by the addition of 15 parts flocculant (Superfloc LMW 300) followed by another 5 minutes of mixing. The co-mulled mixture was then extruded into trilobes that were dried in air at an approximate temperature of 250 F. for about 1 hour. Thereafter, the dried extrudates were calcined in air for 1 hour at a temperature of 1400 F. Presented in Table 2 are the metal loadings of the four catalysts along with their pore structure details. As shown in Table 2 below, all four comparative catalysts have significant amounts (greater than or equal to 0.22 cc/g) of pores in the range of over 160 Å, greater than 20% of their Total Pore Volume in pores with diameters in the range of over 250 Å and less than 65% of the Total Pore Volume in pores with diameters in the range of 55-115 Å.

TABLE 2

| | | Comp A Reference Catalyst, Cylinder | Comp B Reference Catalyst, Trilobe | Comp C USPASN US2010/0243526 (B) | Comp D USPASN US2010/0243526 (A) |
|---|---|---|---|---|---|
| Catalyst Particle Shape | | Cylinder | Trilobe | Cylinder | Cylinder |
| Catalyst Particle Diameter, mm | | 1.1 | 1.05 | 1.0 | 1.01 |
| L/D | | 2.6 | 2.4 | 3.0 | 3.0 |
| Group VIII metal oxide | wt % | 2.0 | 1.9 | 3.1 | 3.0 |
| Group VI-B metal oxide | wt % | 10.8 | 10.4 | 7.2 | 9.18 |
| Phosphorus oxide | wt % | 1.2 | 0.9 | 0.9 | 0.9 |
| $NiO/MoO_3$ ratio | | 0.19 | 0.18 | 0.43 | 0.33 |
| Nitrogen Surface Area | m$^2$/g | 277 | 268 | 272 | 271 |
| Hg Porosimetry | | | | | |
| Total Pore Volume (TPV) | cc/g | 0.87 | 0.85 | 0.87 | 0.91 |
| PV 55-115A | % TPV | 57.8 | 65.5 | 63.4 | 59.0 |
| PV > 160A | cc/g | 0.29 | 0.22 | 0.24 | 0.28 |
| PV > 250A | % TPV | 29.0 | 22.2 | 23.5 | 26.3 |
| PV > 500A | cc/g | 0.2 | 0.2 | 0.2 | 0.2 |
| PV > 1000A | % TPV | 23.1 | 16.6 | 16.4 | 19.1 |
| PV > 5000A | % TPV | 9.1 | 1.7 | 1.9 | 2.4 |

Each of the catalysts was tested for its catalytic performance in the hydroprocessing and hydroconversion of a heavy hydrocarbon feed. The heavy hydrocarbon feed used in the performance test was Arabian Medium vacuum residue with properties as follow: density of 1.0344 g/cc; sulfur content of 5.3 wt. %; MCR content of 20.8 wt. %; and a pitch content (pitch is defined in this Example 2 to be those hydrocarbons having a boiling temperature greater than 538° C. or 1000° F.) of 88.0 wt. % by ASTM D-1160.

The tests were conducted in a simulated two-stage ebullated bed unit that consisted of two continuous stirred tank reactor (CSTR) units obtained from Autoclave Engineers and equipped with Robinson-Mahoney internals connected together in series flow. Each reactor was loaded with 51.1 cc of catalyst. The operating conditions included an operating pressure of about 2250 psi, an operating temperature of 424° C. (795° F.), a liquid hourly space velocity of about 0.55 cc of feed per cc of catalyst per hour, and a hydrogen-to-oil ratio of about 4100 SCF/bbl.

The following Table 3 presents the results from the testing of the Comparative Catalysts A, B, C and D.

TABLE 3

|  | Comp A Reference Catalyst, Cylinder | Comp B Reference Catalyst, Trilobe | Comp C USPASN US2010/ 0243526 (B) | Comp D USPASN US2010/ 0243526 (A) |
| --- | --- | --- | --- | --- |
| Pitch Conversion, vol % | 72 | 72 | 67 | 75 |
| MCR Conversion, wt % | 70 | 68 | 66 | 71 |
| Sulfur Conversion, wt % | 81 | 81 | 79 | 82 |
| 343° C.+ (650° F.+) SHFT Sediment, wt % | ≤0.1 | ≤0.1 | ≤0.1 | ≤0.1 |
| Sulfur in Product VGO Cut (343-538° C. or 650-1000° F.), wt % | 1.1 | 1.1 | 1.1 | 1.2 |
| Sulfur in Product VR Cut (538° C.+ or 1000° F.+), wt % | 2.4 | 2.4 | 2.6 | 2.5 |

It is clear from Table 3 that all four catalysts operate at high pitch conversion with low sediment production. Catalyst D provides additional pitch conversion as discussed in US Pat. Appl. No. 2010/0243526. However it is noted that none of these Comparative Catalysts improves upon the sulfur contents in the product VGO and product unconverted vacuum resid streams. In the case of Comparative Catalyst D, hydrodesulfurization (sulfur conversion) increases but only to a lesser extent compared to pitch conversion. This results in product streams with the same of higher sulfur content.

EXAMPLE 3

In Example 3, two catalysts were prepared with a different pore size distribution from the catalysts of Example 2. Comparative Catalyst E is outside the scope of the present invention. Comparative Catalyst E was made so as to have the same mercury Pore Size Distribution as required in U.S. Pat. No. 5,498,586 and was extruded as cylinders not having any lobes. Catalyst Example 1 is the catalyst of the Instant Invention and was prepared so as to have its novel mercury Pore Size Distribution and was extruded in a trilobe shape.

Comparative Catalyst E

A co-mulled mixture was prepared by mixing in a muller mixer 2925.6 parts (2200.0 on a dry basis) alumina powder and 628.2 parts (599.6 on a dry basis) green catalyst fines with a molybdenum component mixture of 650.8 parts ammonium heptamolybdate solution (27% MoO3) and 1437.8 parts water and a nickel component mixture of 134.5 parts nickel nitrate solution (14% Ni), 171.8 parts 70% nitric acid and 1437.8 parts water. The components were mulled for 35 minutes followed by the addition of 15 parts flocculant (Superfloc LMW 300) followed by another 5 minutes of mulling. The co-mulled mixture was then extruded into extrudates that were dried in air at an approximate temperature of 250° F. for about 40 minutes. Thereafter, the dried extrudates were calcined in air for 1 hour at a temperature of 1,400° F.

CATALYST EXAMPLE 1

According to the Claimed Invention

A co-mulled mixture was prepared by mixing in a muller mixer 2925.7 parts (2200.1 on a dry basis) alumina powder and 628.2 parts (599.6 on a dry basis) green catalyst fines with a molybdenum component mixture of 650.8 parts ammonium heptamolybdate solution (27% MoO3) and 1437.9 parts water and a nickel component mixture of 134.5 parts nickel nitrate solution (14% Ni), 171.8 parts 70% nitric acid and 1437.9 parts water. The components were mulled for 30 minutes followed by the addition of 15 parts flocculant (Superfloc LMW 300) followed by another 5 minutes of mixing. The co-mulled mixture was then extruded into trilobes that were dried in air at an approximate temperature of 250° F. for about 1 hour. These trilobes were made in to the shape as shown in FIG. 1, where $D_O$ is 1.02 mm, $D_I$ is 0.43 mm and H is 3.2 mm. Thereafter, the dried extrudates were calcined in air for 1 hour at a temperature of 1,400° F.

Presented in Table 4 are the metal loadings of these two catalysts along with their pore structure details. As shown in Table 4 below, Comparative Catalyst E meets the mercury Pore Size Distribution specifications of U.S. Pat. No. 5,498, 586. Inventive Catalyst 1 has a unique mercury Pore Size Distribution.

TABLE 4

|  |  | Comp A Reference Catalyst, Cylinder | Comp E USPN 5,498,586 Pore Size Distribution, Cylinder | Inventive Catalyst 1 Inventive Catalyst 1 |
| --- | --- | --- | --- | --- |
| Catalyst Particle Shape |  | Cylinder | Cylinder | Trilobe |
| Catalyst Particle Diameter, mm |  | 1.1 | 1.0 | 1.03 |
| L/D |  | 2.6 | 2.8 | 2.9 |
| Group VIII metal oxide | wt % | 2.0 | 1.7 | 1.9 |
| Group VI-B metal oxide | wt % | 10.8 | 9.9 | 10.4 |
| Phosphorus oxide | wt % | 1.2 | 0.7 | 0.9 |
| NiO/MoO3 ratio |  | 0.19 | 0.18 | 0.18 |
| Nitrogen Surface Area | m2/g | 277 | 264 | 265 |
| Hg Porosimetry |  |  |  |  |
| Total Pore Volume (TPV) | cc/g | 0.87 | 0.77 | 0.70 |
| PV 55-115A | % TPV | 57.8 | 70.7 | 79.7 |
| PV > 160A | cc/g | 0.29 | 0.15 | 0.08 |
| PV > 250A | % TPV | 29.0 | 14.8 | 7.2 |
| PV > 500A | cc/g | 0.2 | 0.1 | 0.0 |
| PV > 1000A | % TPV | 23.1 | 7.6 | 2.2 |
| PV > 5000A | % TPV | 9.1 | 0.9 | 0.3 |

These catalysts were tested in the same manner and with the same Arabian Medium vacuum resid feedstock as in Example 2, above. The results are given in Table 5.

TABLE 5

|  | Comp A Reference Catalyst, Cylinder | Comp E USPN 5,498,586 Pore Size Distribution, Cylinder | Inventive Catalyst 1 Inventive Catalyst 1 |
|---|---|---|---|
| Pitch Conversion, vol % | 72 | 73 | 72 |
| MCR Conversion, wt % | 70 | 70 | 70 |
| Sulfur Conversion, wt % | 81 | 82 | 84 |
| 343° C.+ (650° F.+) SHFT Sediment, wt % | ≤0.1 | ≤0.1 | ≤0.1 |
| Sulfur in Product VGO Cut (343-538° C. or 650-1000° F.), wt % | 1.1 | 1.0 | 0.8 |
| Sulfur in Product VR Cut (538° C.+ or 1000° F.+), wt % | 2.4 | 2.5 | 2.2 |

It is clear from Table 5 that both of these catalysts operate at high pitch conversion with low sediment production. Catalyst E provides a small increment of additional pitch conversion. Catalyst E does provide some decreased sulfur content in the product VGO stream. However, it is noted that Catalyst E improves upon the sulfur contents in the product VGO only a minimal amount Catalyst E does not lower the sulfur content of the vacuum resid streams. Only the Inventive Catalyst 1 is able to provide for the high conversion of the heavy feedstock without incremental formation of sediment in the hydroconverted product, improves hydrodesulfurization by +3 wt. % absolute and efficiently produces lower sulfur contents in both the VGO and unconverted pitch products at the same time.

EXAMPLE 4

In Example 4, two catalysts were prepared with a different pore size distribution from the catalysts of Example 2. Comparative Catalyst F is outside the scope of the present invention. Comparative Catalyst F was made so as to have the same mercury Pore Size Distribution as required in U.S. Pat. No. 5,498,586 and was extruded as trilobes. Inventive Catalyst 2 is another catalyst of the Instant Invention and was prepared so as to have its' novel mercury Pore Size Distribution and was also extruded as trilobes in the shape and size of Catalyst Example 1.

Comparative Catalyst F (Sample 2)

A co-mulled mixture was prepared by mixing in a muller mixer 2898.4 parts (2179.8 on a dry basis) alumina powder and 695.2 parts (599.6 on a dry basis) green catalyst fines with a molybdenum component mixture of 552.2 parts ammonium heptamolybdate solution (27% $MoO_3$) and 1333.5 parts water and a nickel component mixture of 385.0 parts nickel nitrate solution (14% Ni), 193.3 parts 70% nitric acid and 1333.5 parts water. The components were mulled for 35 minutes followed by the addition of 15 parts flocculant (Superfloc LMW 300) followed by another 5 minutes of mulling. The co-mulled mixture was then extruded into trilobes that were dried in air at an approximate temperature of 250° F. for about 40 minutes. Thereafter, the dried extrudates were calcined in air for 1 hour at a temperature of 1,395° F.

Inventive Catalyst 2 (According to the Claimed Invention)

A co-mulled mixture was prepared by mixing in a muller mixer 2898.4 parts (2179.8 on a dry basis) alumina powder and 695.2 parts (599.6 on a dry basis) green catalyst fines with a molybdenum component mixture of 552.2 parts ammonium heptamolybdate solution (27% MoO3) and 1220.1 parts water and a nickel component mixture of 385.0 parts nickel nitrate solution (14% Ni), 236.2 parts 70% nitric acid and 1220.1 parts water. The components were mulled for 35 minutes followed by the addition of 15 parts flocculant (Superfloc LMW 300) followed by another 5 minutes of mulling. The co-mulled mixture was then extruded into trilobes that were dried in air at an approximate temperature of 250° F. for about 40 minutes. Thereafter, the dried extrudates were calcined in air for 1 hour at a temperature of 1,400° F.

Presented in Table 6 are the metal loadings of these two catalysts along with their pore structure details. As shown in Table 4 above, Comparative Catalyst F also meets the mercury Pore Size Distribution specifications of U.S. Pat. No. 5,498,586. Inventive Catalyst 2 has a unique mercury Pore Size Distribution. Both catalysts are trilobes.

TABLE 6

|  |  | Comp A Reference Catalyst, Cylinder | Comp F USPN 5,498,586 Pore Size Distribution, Trilobe (Sample 2) | Inventive Catalyst 2 Inventive Catlayst 2 |
|---|---|---|---|---|
| Catalyst Particle Shape |  | Cylinder | Trilobe | Trilobe |
| Catalyst Particle Diameter, mm |  | 1.1 | 1.1 | 1.0 |
| L/D |  | 2.6 | 3.0 | 3.2 |
| Group VIII metal oxide | wt % | 2.0 | 3.0 | 3.0 |
| Group VI-B metal oxide | wt % | 10.8 | 9.4 | 9.4 |
| Phosphorus oxide | wt % | 1.2 | 1.1 | 1.1 |
| $NiO/MoO_3$ ratio |  | 0.19 | 0.32 | 0.32 |
| Nitrogen Surface Area | m2/g | 277 | 299 | 267 |
| Hg Porosimetry |  |  |  |  |
| Total Pore Volume (TPV) | cc/g | 0.87 | 0.76 | 0.68 |
| PV 55-115A | % TPV | 57.8 | 71.9 | 78.6 |
| PV > 160A | cc/g | 0.29 | 0.14 | 0.08 |
| PV > 250A | % TPV | 29.0 | 13.5 | 6.7 |
| PV > 500A | cc/g | 0.2 | 0.1 | 0.0 |
| PV > 1000A | % TPV | 23.1 | 5.2 | 1.8 |
| PV > 5000A | % TPV | 9.1 | 1.0 | 0.9 |

Each of the catalysts was tested for its catalytic performance in the hydroprocessing and hydroconversion of a heavy hydrocarbon feed in a manner similar to that employed in Example 2. The heavy hydrocarbon feed used in these performance tests was a more recent receipt of Arabian Medium vacuum residue with properties as follow: density of 1.0382 g/cc; sulfur content of 5.8 wt. %; MCR content of 22.7 wt. %; and a pitch content (pitch is defined in this Example 4 to be those hydrocarbons having a boiling temperature greater than 538° C. or 1000° F.) of 89.1 wt. % by High Temperature Simulated Distillation. The results are given in Table 7.

TABLE 7

|  | Comp A Reference Catalyst, Cylinder | Comp F USPN 5,498,586 Pore Size Distribution, Trilobe (Sample 2) | Inventive Catalyst 2 Inventive Catalyst 2 |
|---|---|---|---|
| Pitch Conversion, vol % | 71 | 71 | 71 |
| MCR Conversion, wt % | 69 | 69 | 70 |

TABLE 7-continued

|  | Comp A Reference Catalyst, Cylinder | Comp F USPN 5,498,586 Pore Size Distribution, Trilobe (Sample 2) | Inventive Catalyst 2 Inventive Catalyst 2 |
|---|---|---|---|
| Sulfur Conversion, wt % 343° C.+ (650° F.+) | 81 | 83 | 84 |
| SHFT Sediment, wt % | ≤0.1 | ≤0.1 | ≤0.1 |
| Sulfur in Product VGO Cut (343-538° C. or 650-1000° F.), wt % | 1.25 | 0.98 | 0.93 |
| Sulfur in Product VR Cut (538° C.+ or 1000° F.+), wt % | 2.47 | 2.27 | 2.20 |

It is clear from Table 7 that both of these catalysts operate at high pitch conversion with low sediment production. Comparative Catalyst F does provide some decreased sulfur content in the product VGO stream and unconverted vacuum bottoms stream. However, the Inventive Catalyst 2 according to the invention is the only catalyst able to provide for the high conversion of the heavy feedstock without incremental formation of sediment in the hydroconverted product, improves hydrodesulfurization by +3 wt. % absolute and most efficiently produces lower sulfur contents in both the VGO and unconverted pitch products at the same time.

The invention claimed is:

1. A hydroprocessing catalyst for treating heavy hydrocarbon feedstocks, wherein said catalyst comprises: a calcined particle comprising a co-mulled mixture made by co-mulling inorganic oxide powder or powders, solution or solutions containing molybdenum and Group VIII metals and optionally water, acid and flocculating agent, and then forming said co-mulled mixture into a particle that is calcined to thereby provide said calcined particle, said calcined particles having:
   a. a total surface area of 240 to 360 m²/g;
   b. a total pore volume of 0.5 to 0.9 cc/g; and
   c. a pore volume distribution such that greater than 60% of pore volume are in pores present as micropores of diameter between 55 and 115 Å, less than 0.12 cc/g of pore volume are in pores present at pores of diameter greater than 160 Å, greater than 5% of the total pore volume is in pores of diameter greater than 210 Å, and less than 10% of pore volume are in pores present as macropores of diameters greater than 250 Å.

2. The catalyst of claim 1, wherein said calcined particle has a shape comprising a first end, a second end and a wall disposed between said ends, said wall comprising 3 or 4 lobes formed in the length of the wall.

3. The catalyst of claim 1, wherein said inorganic oxide material is selected from the group consisting of alumina, silica and alumina-silica.

4. The catalyst of claim 1, wherein said calcined mixture has a molybdenum content in the range of from 1 weight percent to 24 weight percent with the weight percent being based upon the molybdenum as $MoO_3$ and the total weight of the calcined mixture, a nickel content in the range of from 0.2 weight percent to 6 weight percent based on the nickel as NiO and the total weight of the calcined mixture, and a phosphorous content in the range from 0 weight percent to 6 weight percent, with the weight percent being based upon the phosphorous as $P_2O_5$ and the total weight of the calcined mixture.

5. The catalyst of claim 2, wherein each calcined particle has an outer circle diameter of $D_O$, an inner circle diameter of $D_I$, and a height of H; the ratio of $D_O$ to $D_I$ is between about 1.5 to 3.0; the ratio of H to $D_O$ is between about 1 to about 4; and the outer circle diameter $D_O$ is between about 0.75 and 2 millimeters.

6. The catalyst of claim 5, wherein the catalyst has a total surface area of 245-285 m²/g, a total pore volume of 0.65-0.75 cc/g, and a pore volume distribution such that greater than 75% of pore volume are in pores present as micropores of diameter between 55 and 115 Å, less than 0.10 cc/g of pore volume are in pores present at pores of diameter greater than 160 Å and 0-9% of pore volume are in pores present as macropores of diameters greater than 250 Å.

7. The catalyst of claim 1, wherein said calcined mixture has a molybdenum content in the range of from 7.5 weight percent to 11 weight percent with the weight percent being based upon the molybdenum as $MoO_3$ and the total weight of the calcined mixture, a nickel content in the range of from 1.5 weight percent to 3.5 weight percent based on the nickel as NiO and the total weight of the calcined mixture, and a phosphorous content in the range from 0 weight percent to 2 weight percent, with the weight percent being based upon the phosphorous as $P_2O_5$ and the total weight of the calcined mixture.

8. The catalyst of claim 5, wherein said calcined particle has three truncated lobes with rounded intersections of the lobes.

9. A method of making a highly stable heavy hydrocarbon hydrodesulfurization, metal removal and pitch conversion catalyst, wherein said method comprises:
   a. forming a co-mulled mixture by co-mulling solid inorganic oxide powders, solution or solutions containing molybdenum and Group VIII metals and optionally water, acid and flocculating agent;
   b. extruding said co-mulled mixture into particles to form a shape comprising a first end, a second end and a wall disposed between said ends, said wall comprising 3 or 4 lobes formed in the length of the wall wherein each lobe; and
   c. calcining said particles at temperatures such that greater than 60% of pore volume are in pores present as micropores of diameter between 55 and 115 Å, less than 0.12 cc/g of pore volume are in pores present at pores of diameter greater than 160 Å, greater than 5% of the total pore volume is in pores of diameter greater than 210 Å, and less than 10% of pore volume are in pores present as macropores of diameters greater than 250 Å; and
   d. wherein said calcined particle has a shape comprising a first end, a second end and a wall disposed between said ends, said wall comprising 3 or 4 lobes formed in the length of the wall, wherein each calcined particle has an outer circle diameter of $D_O$, an inner circle diameter of $D_I$, and a height of H; the ratio of $D_O$ to $D_I$ is between about 1.5 to 3.0; the ratio of H to $D_O$ is between about 1 to about 4; and the outer circle diameter $D_O$ is between about 0.75 and 2 millimeters.

10. The method of claim 9, wherein said calcining step is conducted under a controlled temperature condition in which the calcination temperature is in the range of from about 482° C. (900° F.) to about 787.7° C. (1450° F.) for a calcination time period that is effective to provide said calcined mixture having a desired pore structure.

11. The method of claim 10, wherein said inorganic oxide material is selected from the group consisting of alumina, silica and alumina-silica.

12. A process comprising: contacting a heavy hydrocarbon feedstock having a nickel content in the range of from 0.1 ppmw to 250 ppmw, a vanadium content in the range of from 0.3 ppmw to 250 ppmw, and a sulfur content in the range of from 0.5 wt % to 8 wt % with any one of the catalyst of claims 1 through 8.

* * * * *